United States Patent [19]
Elwell et al.

[11] Patent Number: 5,936,055
[45] Date of Patent: Aug. 10, 1999

[54] ACID FUNCTIONALIZED POLYURETHANE ADDUCTS

[75] Inventors: Michael J. Elwell, IJzendijke; Hanno R. van der Wal, Hoek; Camiel F. Bartelink, Terneuzen; Henri J. Grünbauer, Oostburg, all of Netherlands

[73] Assignee: The Dow Chemical Company, Midland, Mich.

[21] Appl. No.: 08/802,148

[22] Filed: Feb. 19, 1997

[51] Int. Cl.⁶ .......................... C08G 18/34; C08G 18/06; C09D 175/04; C08L 75/04
[52] U.S. Cl. .......................... 528/44; 524/591; 524/839; 524/840; 528/59; 528/66; 528/71; 528/76; 528/77; 528/80; 528/84; 528/85; 560/25; 560/26; 560/115; 560/157; 560/158; 562/433; 562/439; 562/441; 562/498; 562/507; 562/560; 562/561; 562/565
[58] Field of Search ..................................... 524/591, 840, 524/839; 528/59, 66, 71, 80, 76, 77, 84, 44, 85; 560/25, 26, 115, 157, 158; 562/433, 439, 441, 498, 507, 560, 561, 565

[56] References Cited

U.S. PATENT DOCUMENTS

| | | | |
|---|---|---|---|
| 4,079,028 | 3/1978 | Emmons et al. | 524/507 |
| 4,129,455 | 12/1978 | Thompson et al. | 560/158 |
| 4,163,749 | 8/1979 | Hauxwell et al. | 560/158 |
| 4,246,391 | 1/1981 | Watson, Jr. | 528/49 |
| 4,358,354 | 11/1982 | Iida et al. | 204/159.15 |
| 4,452,930 | 6/1984 | Moriarity | 523/418 |
| 4,506,055 | 3/1985 | Bristowe et al. | 525/424 |
| 4,743,673 | 5/1988 | Johnston et al. | 528/60 |
| 4,882,379 | 11/1989 | Pankratz | 524/590 |
| 5,041,516 | 8/1991 | Frechet et al. | 528/44 |
| 5,071,951 | 12/1991 | Ulrich et al. | 528/111 |
| 5,104,928 | 4/1992 | Craun et al. | 524/773 |
| 5,136,009 | 8/1992 | Meixner et al. | 528/49 |
| 5,236,960 | 8/1993 | Harrison et al. | 521/51 |
| 5,281,654 | 1/1994 | Eisenhart et al. | 524/500 |
| 5,473,048 | 12/1995 | Sarkar | 528/376 |
| 5,493,000 | 2/1996 | Aharoni | 528/350 |
| 5,502,152 | 3/1996 | Shimada et al. | 528/71 |
| 5,635,581 | 6/1997 | Chiang et al. | 528/60 |

FOREIGN PATENT DOCUMENTS

| | | |
|---|---|---|
| 1270046 | 12/1968 | Germany . |
| 4101239 | 4/1992 | Germany . |
| 1182365 | 2/1970 | United Kingdom . |
| 2139239 | 11/1984 | United Kingdom . |
| 96/34904 | 11/1996 | WIPO . |

*Primary Examiner*—Rabon Sergent

[57] ABSTRACT

Disclosed is an acid-funtionalized polyurethane adduct and a process for the preparation of such adduct. The adduct having a linear or preferably branched structure comprises a plurality of internal urethane linkages and one or more terminal carboxylic acid groups per molecule. Such acid-funtionalized polyurethane adducts find value in the manufacture of crosslinked aqueous rubber latexes such as might be used in paint compositions.

5 Claims, No Drawings

ACID FUNCTIONALIZED POLYURETHANE ADDUCTS

BACKGROUND

This invention relates to a polyurethane adduct comprising a structo-terminal carboxylic acid group. More specifically this invention relates to an adduct which contains a plurality of internal urethane linkages, and which additionally bears one or more terminal carboxylic acid groups per molecule.

In general, urethane-containing adducts are prepared by reacting an organic polyisocyanate with an active hydrogen-containing substance. The reaction may be conducted in the presence of a solvent and various addition sequences of isocyanate with active hydrogen-containing substances employed so as to arrive at an end product that can be substantially free of any isocyanate functionality or isocyanate-reactive functionality such as disclosed in U.S. Pat. No. 4,079,028. The products disclosed are essentially non-reactive products having value as a rheology modifying agent in various application areas including paint compositions and cosmetics. However it is noted that the procedure of preparing adducts as reported in U.S. Pat. No. 4,079,028 is deficient with respect to control of molecular weight build-up leading to undesirable gelation or solids formation. Liquid adducts are generally favored for convenience of industrial processes.

There is now a desire to modify such adducts and provide alternative molecules that are "tailored" to perform multiple tasks whereby their rheological characteristics can be exploited in other application areas including, for example, surface protection and adhesives. By surface protection, it is understood the protection of a surface by coating that surface with a protective substance. By adhesive, it is understood the bonding of a first surface to a second surface that can be of a like or different substrate. In conventional surface coating chemistry and adhesion technology, frequently many different molecules are used in sequence or in combination to achieve the desired end result. Accordingly, it would be attractive to provide an alternative molecule which can reduce, or even overcome, the need to use multiple molecules. It would further be desirable to be able to prepare such alternative molecule by a process devoid of the deficiencies of the above noted art procedure.

To this purpose, the present investigations have been directed to the preparation of polyurethane adducts, preferably being a liquid at room temperature, which are functionalized with carboxylic acid groups at the end of the polymer chains. As carboxylic acids are reactive towards the isocyanate moiety it has been necessary to develop a synthetic procedure which provides for the formation of a polymer containing urethane linkages and carboxylic acid functionality.

SUMMARY

In a first aspect, this invention relates to a polyurethane polymer which comprises a backbone containing a plurality of urethane linkages wherein the termini of the backbone are capped with one or more carboxylic acid functional groups.

In a second aspect, this invention relates to a process for preparing a polyurethane polymer having a backbone containing a plurality of urethane linkages wherein the termini of the backbone is capped with one or more carboxylic acid functional groups which comprises saponifying of an ester-modified polyurethane polymer that has a backbone containing a plurality of urethane linkages and which is end capped with one or more alkyl ester moieties.

In a third aspect, this invention relates to a method of preparing an aqueous latex wherein said latex is prepared in the presence of the above mentioned polyurethane polymer.

In a fourth aspect, this invention relates to a paint composition which comprises an aqueous latex wherein said latex is prepared in the presence of an acid functionalized polyurethane polymer as above mentioned.

DETAILED DESCRIPTION

The polyurethane polymer of this invention is characterized in that it comprises a backbone containing a plurality of urethane linkages and wherein the termini of the backbone are end capped with one or more carboxylic acid groups. Advantageously the polymer backbone has a radial, or star-like, structure though it can also be a dendritic, tree-like, or linear structure. When of a radial structure the polymer advantageously has from about 3 to about 8, preferably from about 3 to about 6 radii per molecule; and contains at least one, preferably from about 3 to about 8, and more preferably from about 3 to about 6 terminal carboxylic acid functional groups per molecule. In a highly preferred embodiment each radial arm is end-capped by a carboxylic acid group. A fuller understanding of the chemical identity of the polyurethane polymer can be obtained by reference to the process of its preparation as described hereinafter.

As noted above, the acid functionalized polyurethane polymer of this invention is obtained by a process which comprises the saponification of a particular alkyl ester adduct. The alkyl ester adduct has a backbone containing a plurality of urethane linkages with the terminal ends of the backbone being end capped by one or more alkyl ester moieties. The alkyl ester end-capped polyurethane polymer is itself obtained by a solvent-free two-step process where firstly, a polyisocyanate is reacted with a substoichiometric amount of polyahl to provide an isocyanate-terminated intermediate, and secondly, the intermediate is reacted with a hydroxyl alkyl ester wherein:

a) the polyisocyanate comprises at least two isocyanate moieties per molecule with a different reactivity to the polyahl; and b) the polyahl is an organic substance having a molecular weight of from about 60 to about 20000 and containing per molecule from two or more isocyanate-reactive functional groups selected from the group consisting of —OH, —SH, —COOH, —NHR where R is hydrogen, alkyl or aryl, or epoxy.

The process of preparing the alkyl ester capped polyurethane polymer requires that the first step be conducted in essentially anhydrous conditions and in the absence of a urethane-promoting catalyst, while the polyahl is added at a controlled rate to the polyisocyanate such that the reaction temperature does not exceed 100° C. and that the total amount of polyahl added is less than a stoichiometric equivalent with respect to the polyisocyanate. In the second step, the hydroxyl alkyl ester is added in a total amount of at least a stoichiometric equivalent with respect to the isocyanate content of the intermediate. Such a stoichiometric amount is required to ensure conversion of all isocyanate functionality present in the intermediate.

Following is a more detailed description of reactants and processing parameters.

The Polyisocyanate

The polyisocyanate used in the process to prepare the polyurethane bearing terminal alkyl ester functionality, hereinafter "the adduct", has at least two isocyanate moieties per molecule and which, with respect to the isocyanate-reactive group of the polyahl, are distinguished by a difference in reactivity. The reactivity difference optimizes the manufacture of a product having a narrow molecular weight distribution and reduces the potential for formation of higher oligomers leading to gel-like or non-liquid products. When the polyisocyanate contains three or more isocyanate groups per molecule then the relative reactivity of the individual isocyanate moieties is such to minimize formation of higher oligomers. Suitable polyisocyanates can be aliphatic or preferably aromatic polyisocyanates and especially aromatic or aliphatic diisocyanates. An advantage to using diisocyanates, where the relative reactivity of the individual isocyanate groups is different, is that it permits the amounts of free, non-reacted, polyisocyanate that may be present in the isocyanate-terminated intermediate to be limited to the subsequent advantage of material requirements for the second process step, and further to the value of the adduct in end applications. Exemplary of suitable aromatic polyisocyanates include toluene diisocyanate, methylene diphenylisocyanate and polymethylene polyphenylisocyanates. Exemplary of suitable aliphatic polyisocyanates include isophorone diisocyanate, hexamethylene-1,6-diisocyanate and methylene dicyclohexylisocyanate. Preferred are polyisocyanates comprising isomers of toluene diisocyanate, of methylene diphenylisocyanate or mixtures thereof. Especially preferred, for reasons of relative isocyanate reactivity, is 2,4'-methylene diphenylisocyanate and notably 2,4-toluene diisocyanate, or mixtures comprising such diisocyanate.

The Polyahl

The polyahl, here meaning a "poly active hydrogen containing substance" used in the process to prepare the adduct comprises two or more isocyanate-reactive functional groups per molecule where such functional groups include —OH, —SH, —COOH, —NHR, with R being hydrogen or an alkyl moiety, or epoxy. Preferred is a polyahl bearing —OH functionality, namely a polyol. The polyahl may contain up to about 8 such functional groups per molecule, preferably from about 2 to about 8, more preferably from about 3 to about 8, and most preferably from about 3 to about 6, functional groups per molecule.

The polyahl used in the process of this invention has a number average molecular weight of from about 60 to about 20,000; preferably from about 200, more preferably from about 1000, and yet more preferably from about 2000; and preferably up to about 15,000, and more preferably up to about 10,000. In a preferred embodiment the polyahl is a polyoxyalkylene polyol where the oxyalkylene entity comprises oxyethylene, oxypropylene, oxybutylene or mixtures of two or more thereof, including especially oxypropylene-oxyethylene mixtures. Alternative polyols that may be used in the invention include polyalkylene carbonate-based polyols and polyphosphate-based polyols. The nature of the polyol selected depends on whether or not to impart some water solubility to the adduct, which can be advantageous for certain applications and disadvantageous for other applications. Water solubility can be enhanced by selection of polyols having a lower molecular weight or an elevated oxyethylene content.

Suitable polyoxyalkylene polyols are exemplified by various commercially available polyols as used in polyurethane, lubricant, surfactancy applications and include polyoxypropylene glycols designated as VORANOL™ P-2000 and P-4000 with respectively molecular weights of 2000 and 4000; polyoxypropylene-oxyethylene glycols such as DOWFAX™ DM-30 understood to have a molecular weight of about 600 and an oxyethylene content of about 65 weight percent, and SYNALOX™ 25D-700 understood to have a molecular weight of about 5500 and an oxyethylene content of about 65 weight percent, all available from The Dow Chemical Company; polyoxyethylene triols available under the trademark TERRALOX™ and designated as product WG-98 and WG-116 understood to have a molecular weight of about 700 and about 980, respectively, polyoxypropylene-oxyethylene triols designated as VORANOL™ CP 1000 and CP 3055 understood to have respectively a molecular weight of about 1000 and about 3000, and VORANOL™ CP 3001 understood to have a molecular weight of about 3000 and an oxyethylene content of about 10 weight percent and VORANOL™ CP 6001 understood to have a molecular weight of about 6000 and an oxyethylene content of about 15 weight percent, all available from The Dow Chemical Company; polyoxypropylene hexols including VORANOL™ RN-482 understood to have a molecular weight of about 700, and polyoxyethylene hexols including TERRALOX™ HP-400 understood to have a molecular weight of about 975, both available from The Dow Chemical Company; higher functionality polyether polyols including those based on carbohydrate initiators such as, for example, sucrose and exemplified by VORANOL™ 370 available from The Dow Chemical Company.

The Hydroxyl Alkyl Ester Substance

The hydroxyl alkyl ester is preferably an organic substance containing one hydroxyl group per molecule. The presence of multiple hydroxyl groups generally is not favorable as this can lead to an undesirable coupling and molecular weight build up. While preferred is a hydroxyl alkyl ester it is to be appreciated that alternative mono functionalized alkyl esters may also be employed where the alternative functionality is a different isocyanate-reactive functional group such as, for example, —SH, —COOH, or —NHR where R is hydrogen or alkyl, or epoxy. Exemplary of suitable hydroxyl alkyl esters include methyl lactate, 3-hydroxydimethylglutarate and structures of the following formula HO—R'—COOR" where R' can be aliphatic $C_1$–$C_{10}$, aromatic, cycloaliphatic and R" is $C_1$–$C_3$ alkyl or phenyl.

The Process

As mentioned, the method of preparing the alkyl ester end-capped polyurethane polymer urethane-containing adduct comprises a first and a second process step, optionally between the first and second step is an intermediate step.

The first step concerns the preparation of an isocyanate-terminated intermediate by reacting the polyisocyanate with the polyahl at a reaction temperature that does not exceed 100° C., in essentially anhydrous conditions. By "essentially anhydrous conditions" it is meant that if water is present, it is in an amount of less than about 1500, preferably less than about 750, more preferably less than about 350 ppm of total polyisocyanate and polyahl reactants. The presence of water in an amount greater than this increases the risk of forming gel or solid products. The reaction temperature advantageously is from about 20° C. more preferably from about 35° C.; and preferably up to about 80° C., more preferably up to about 70° C. At higher reaction temperatures, the beneficial effect of the relative isocyanate reactivity rates can be substantially diminished, and additionally isocyanate may be consumed by an undesirable allophonate reaction. The polyahl is added at a controlled rate to the polyisocyanate such that the reaction temperature does not exceed 100° C., and the total amount of polyahl added is a stoichiometric equivalent or less with respect to the polyisocyanate. The total amount of polyahl advantageously does not exceed about 0.99, preferably does not exceed about 0.95 of an equivalent; and advantageously is at least 0.1, preferably at least 0.25, and more preferably from about 0.5 of an equivalent per equivalent of isocyanate.

As already mentioned, the first process step is conducted in essentially anhydrous conditions and in the absence of a processing aid. By the term "processing aid" in the context of this invention, it is meant substances that promote the formation of urethane linkage by reaction of isocyanate with an active hydrogen atom. To minimize potential gel formation, solidification, it is advantageous to use polyahls that do not contain any catalyst or catalyst finishing residues, for example, potassium acetate, which might promote urethane formation or isocyanate dimerization or trimerization. Additionally to minimize gel formation when preparing the intermediate it is advantageous to use polyahls, especially polyols, that have an acid content; such procedures when preparing isocyanate-terminated prepolymers are known from the general art.

When the resulting isocyanate-terminated intermediate has a high free, unreacted, isocyanate content, and before proceeding with the second step of the process it can be advantageous to reduce such content by, for example, distillation or extraction techniques using suitable solvents including pentane or hexane. Free, unreacted isocyanate can participate in the second process step providing capped products, the presence of which in the final product may be detrimental to performance in certain end applications.

In the second step of the process, the isocyanate-terminated intermediate is reacted with a hydroxyl alkyl ester in an at least stoichiometric amount with respect to the isocyanate content of the intermediate. For the second step, the process temperature is chosen for convenience of reaction time and can be greater than 100° C. without noticeable detriment to the quality of the resulting adduct and its performance in end applications. In general, exposure to a temperature greater than 120° C. should be minimized for the purpose of avoiding undesirable side reactions including allophonate formation. The reaction of the isocyanate-terminated intermediate with the polyfunctional substance can, if desired, be accelerated by use of a suitable urethane-promoting catalyst. Representative of such catalysts include tertiary amine compounds and organotin compounds as used when preparing, for example, polyurethane foam by reaction of a polyisocyanate with a polyol. It is to be noted that use of a catalyst in the second step can lead to final adducts having a higher viscosity than those prepared in the absence of catalyst.

The above described two-step process is the presently preferred method of manufacturing the adduct as it provides the possibility of manufacturing a standard intermediate master batch that can then be reacted with various hydroxyl alkyl esters to provide adducts suited to different application areas. Other methods can be envisioned including, for example, first reacting the polyfunctional substance with an excess of polyisocyanate to provide an alternative isocyanate-terminated intermediate and subsequently reacting this with the polyahl. Other alternative methods can involve continuous, in contrast to batch, production procedures.

The so obtained alkyl ester end-capped polyurethane polymer is subsequently contacted with a basic substance causing the ester functionality to be come hydrolyzed and converted to an acid. Preferred basic substances include aqueous sodium hydroxide or potassium hydroxide. Following hydrolysis, the resulting acid can be isolated by conventional acid/base solvent extraction techniques as widely practiced in organic chemistry.

The acid functionalized polyurethane adduct disclosed herein has value in latex preparation procedures whereby the polyurethane polymer is able to contribute to the rheology properties and stability of the latex. The acid functionality provide a means of simultaneously crosslinking the latex. When used in a process to produce a rubber latex, the acid funtionalized polyurethane may be used directly as the acid or preferably as a metal carboxylate salt where typically the metal is sodium or potassium. Use of a metal carboxylate salt enhances compatibility with the aqueous process conditions. Such crosslinked latexes have a wide industrial application including notably in paint compositions.

The invention is illustrated by the following examples in which all parts and percentages are by weight, unless otherwise stated.

EXAMPLE 1

In the first step, toluene diisocyanate, 125.9 parts by weight, is introduced into a reaction vessel and brought to 50° C. under a nitrogen atmosphere. To the toluene diisocyanate is added incrementally over a period of about 8 hours, and with stirring, 500 parts by weight of a glycerine-initiated poly(oxyethylene-oxypropylene) polyol having a hydroxyl equivalent weight of about 760 and with a 57:43 parts by weight ratio of oxyethylene to oxypropylene. The rate of addition is controlled so as to avoid temperature fluctuations of more than±10° C. The resulting mixture is then retained at 50° C. and continuously stirred for an additional 12 hours before proceeding with the next step of the preparation procedure.

In the next step, the above intermediate is, based on its isocyanate content, reacted with a stoichiometric amount of (s)-(-) methyl lactate to provide the ester-capped polyurethane adduct.

The isocyanate functionalized reactive intermediate (0.2074 equivalents NCO) was charged to a 1 liter, five-necked flange reaction vessel equipped with a mechanical stirrer, reflux condenser, thermocouple probe, nitrogen inlet and addition funnel. Between the nitrogen gas supply and the inlet to the reaction vessel were a Dreschel bottle containing concentrated sulphuric acid and a drying tube containing anhydrous calcium sulphate, respectively. This was to ensure that trace moisture was eliminated. The (s)-(-) methyl lactate (0.2074 equivalents OH) was charged to the addition funnel. The contents of the reaction vessel were then raised to a temperature of 50±1° C. On reaching this temperature, the (s)-(-) methyl lactate was added to the intermediate at a rate of >>80 g h$^{-1}$. The agitation speed was of the order of 750±50 rpm. After complete addition of the (s)-(-) methyl lactate, 0.92 g of dibutyl tin dilaurate catalyst (DABCO™ T-12) was added to the contents of the reaction vessel. At frequent intervals during the reaction, infra-red spectra were recorded. The reaction was allowed to proceed until the absorbance associated with the isocyanate functional group (2270 cm$^{-1}$) was no longer present in the mid infra-red spectrum. The total reaction time to obtain the methyl ester funtionalized polyurethane adduct was 2 hours.

The carboxylic acid end-capped polyurethane polymer is obtained by hydrolysis of the so obtained ester.

The methyl ester functionalized polyurethane adduct (51.74 parts) and 0.1 M sodium hydroxide solution (Baker reagent, 497.10 g, to give~10% solution wt./wt.) were charged to a 1 liter, three-necked round-bottom flask equipped with a mechanical stirrer, reflux condenser, thermocouple probe and nitrogen inlet. The temperature of the contents of the flask were then raised to 60±2° C., whereby they underwent gentle reflux. The agitation speed was of the order of 750±50 rpm. Initially, the methyl ester functionalized polyurethane adduct was present as an upper layer above the aqueous sodium hydroxide solution. As the reaction proceeded, the ester layer gradually disappeared to yield a translucent solution which was a somewhat 'murky' gray in appearance. The total reaction time was 20 hours. After this time, the flask and contents were allowed to cool to ambient temperature. The solution was then acidified to about pH 1 using concentrated hydrochloric acid (Baker reagent). At about pH 2, the polymer acid started to separate from the aqueous phase forming a cream-colored, emulsion-like layer above the aqueous layer. pH was determined using universal indicator paper. The carboxylic acid is insoluble in water but soluble in an organic solvent. Chloroform (Baker reagent) was employed as the extraction solvent. A saturated solution of sodium chloride (in distilled water) was added to the chloroform-product/aqueous layer. The chloroform was removed from the carboxylic acid functionalized polyurethane adduct via rotary film evaporation at 40±1° C./3–5 mm Hg. The product was analyzed via spectroscopic techniques to detect the presence of specific functional groups, analyzed via pH titrimetry for acid number determination and analyzed via size exclusion chromatography for molar mass, and molar mass distribution.

What is claimed is:

1. A polyurethane polymer which comprises a backbone containing a plurality of urethane linkages and wherein the termini of the backbone are capped with one or more carboxylic acid functional groups and the polymer backbone has a radial structure.

2. The polyurethane polymer of claim 1 wherein the radial structure has from about 3 to about 8 radii per molecule.

3. The polyurethane polymer of claim 2 which contains from about 3 to about 8 terminal carboxylic acid functional groups per molecule.

4. A method for preparing an aqueous latex wherein said latex is prepared in the presence of a polyurethane polymer as claimed in claim 1.

5. A paint composition which comprises an aqueous latex wherein said latex is prepared in the presence of a polyurethane polymer as claimed in claim 1.

* * * * *